US012008010B2

(12) United States Patent
Bond et al.

(10) Patent No.: US 12,008,010 B2
(45) Date of Patent: *Jun. 11, 2024

(54) SYSTEMS AND METHODS FOR VISUALIZING ONE OR MORE DATASETS

(71) Applicant: Palantir Technologies Inc., Denver, CO (US)

(72) Inventors: Ethan Bond, New York, NY (US); Michael Nazario, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,204

(22) Filed: Dec. 20, 2022

(65) Prior Publication Data

US 2023/0185819 A1 Jun. 15, 2023

Related U.S. Application Data

(63) Continuation of application No. 17/074,678, filed on Oct. 20, 2020, now Pat. No. 11,561,992.

(60) Provisional application No. 62/923,685, filed on Oct. 21, 2019.

(51) Int. Cl.
*G06F 16/248* (2019.01)
*G06F 3/0482* (2013.01)
*G06F 16/2455* (2019.01)

(52) U.S. Cl.
CPC .......... *G06F 16/248* (2019.01); *G06F 3/0482* (2013.01); *G06F 16/2456* (2019.01)

(58) Field of Classification Search
CPC ... G06F 16/248; G06F 3/0482; G06F 16/2456
See application file for complete search history.

(56) References Cited

U.S. PATENT DOCUMENTS

| | | | | |
|---|---|---|---|---|
| 5,119,465 A | * | 6/1992 | Jack | G06F 16/258 |
| | | | | 717/137 |
| 7,051,021 B1 | * | 5/2006 | Luo | G06F 16/2471 |
| | | | | 707/999.005 |
| 7,461,077 B1 | | 12/2008 | Greenwood | |
| 8,712,993 B1 | * | 4/2014 | Ordonez | G06F 16/24556 |
| | | | | 707/718 |
| 9,335,911 B1 | | 5/2016 | Elliot et al. | |

(Continued)

*Primary Examiner* — Yuk Ting Choi
(74) *Attorney, Agent, or Firm* — Faegre Drinker Biddle & Reath LLP

(57) ABSTRACT

In some embodiments, systems and methods for visualizing one or more datasets include importing a plurality of root objects, each root object including linked data attributes and obtaining a joined dataset based on the plurality of root objects, that includes for each or the plurality of root objects, a plurality of rows of related attribute data linked to each root object as a result of a join operation. The systems and methods perform an aggregation computation on the plurality of rows of related attribute data corresponding to each of the plurality of root objects to produce a corresponding single aggregation row of consolidated data for each root object and present a user interface that shows each of the plurality of root objects with their corresponding single aggregation row of consolidated data resulting from the aggregation computation, in a one-to-one manner.

18 Claims, 7 Drawing Sheets

(56) References Cited

U.S. PATENT DOCUMENTS

| | | | |
|---|---|---|---|
| 9,779,150 B1* | 10/2017 | Sherman | G06F 16/26 |
| | | | 707/718 |
| 9,792,020 B1 | 10/2017 | Kelley et al. | |
| 9,870,389 B2 | 1/2018 | Elliot et al. | |
| 10,157,200 B2 | 12/2018 | Elliot et al. | |
| 10,678,783 B2 | 6/2020 | Elliot et al. | |
| 2004/0181543 A1 | 9/2004 | Wu et al. | |
| 2006/0136382 A1* | 6/2006 | Dettinger | G06F 16/248 |
| | | | 707/718 |
| 2010/0161644 A1 | 6/2010 | Crim et al. | |
| 2010/0205521 A1* | 8/2010 | Folting | G06F 40/18 |
| | | | 715/227 |
| 2010/0235347 A1* | 9/2010 | Chaudhuri | G06F 16/24542 |
| | | | 707/E17.014 |
| 2011/0107254 A1* | 5/2011 | Moroze | G06F 40/177 |
| | | | 715/782 |
| 2014/0273930 A1* | 9/2014 | Rossi | H04M 15/43 |
| | | | 455/406 |
| 2015/0032730 A1 | 1/2015 | Cialdea, Jr. et al. | |
| 2015/0046499 A1* | 2/2015 | Choi | G06F 16/235 |
| | | | 707/803 |
| 2015/0293946 A1 | 10/2015 | Fong et al. | |
| 2018/0039399 A1 | 2/2018 | Kaltegaertner et al. | |

\* cited by examiner

600

| NAME OF THE RESOURCE | | | | | FILTER | VISUALIZE |
|---|---|---|---|---|---|---|
| | MAX (GRADE), CONCAN (SITE), SUM (A, B) | | | | 414 | |
| PATIENT ID | GRADE | SITE | DATE | PHYSICIAN | LOCATION | |
| PATIENT ID 1524 | 4 BRAIN, SKIN, LUNG ~604a | | | | | |
| | 3 | BRAIN | -/-/- | ~ | ~ | |
| | 1 | LUNG | -/-/- | ~ | ~ | 414 → 418 |
| | 2 | SKIN | -/-/- | ~ | ~ | |
| | 4 | SKIN | -/-/- | ~ | ~ | |
| | 4 | BRAIN | -/-/- | ~ | ~ | |
| | +7 MORE | | | | | |
| PATIENT ID 1100 | 3 BRAIN, HEART ~604b | | | | | |
| | 3 | HEART | -/-/- | ~ | ~ | 414 → 418 |
| | 2 | BRAIN | -/-/- | ~ | ~ | |
| | 1 | BRAIN | -/-/- | ~ | ~ | |
| | 1 | HEART | -/-/- | ~ | ~ | |
| | 1 | BRAIN | -/-/- | ~ | ~ | |
| PATIENT ID 1608 | 4 SKIN ~604c | | | | | |
| | 4 | SKIN | -/-/- | ~ | ~ | 414 → 418 |
| | 4 | SKIN | -/-/- | ~ | ~ | |
| | 2 | SKIN | -/-/- | ~ | ~ | |
| | 1 | SKIN | -/-/- | ~ | ~ | |
| PATIENT ID 113 | 4 LUNG ~604d | | | | | |
| | 3 | LUNG | -/-/- | ~ | ~ | 414 → 418 |
| | 1 | LUNG | -/-/- | ~ | ~ | |
| | 4 | LUNG | -/-/- | ~ | ~ | |
| PATIENT ID 1032 | 1 BRAIN ~604e | | | | | |
| | 1 | BRAIN | -/-/- | ~ | ~ | 414 → 418 |
| | 1 | BRAIN | -/-/- | ~ | ~ | |

☐ : 1,623 PATIENTS — 420
○ : 28 PATIENTS — 420

SYSTEMS AND METHODS FOR VISUALIZING ONE OR MORE DATASETS

1. CROSS REFERENCE TO RELATED APPLICATIONS

This application is a continuation of U.S. application Ser. No. 17/074,678 filed Oct. 20, 2020, which claims priority to U.S. Provisional Patent Application No. 62/923,685, entitled "Systems and Method for Visualizing One or More Datasets," and filed on Oct. 21, 2019, both of which are incorporated by reference herein for all purposes.

2. BACKGROUND

Certain embodiments of the present invention are directed to visualizing table join operations on data sets. More particularly, some embodiments of the present invention provide systems and methods for visualizing one or more data sets using root object rows having aggregated data from table join operations.

Exploration, mining and analysis of high-volume data sources can be a time and resource intensive processes, both for the user and for the underlying computing systems which provide data analysis features. Large volumes of data contribute to high consumption of computer memory and processing of such large volumes of data can require extremely powerful computer processors and processing time. Users such as data analysists often face a seemingly insurmountable task of attempting to analyze the data. Often many iterations are required to explore the data that is required, and each iteration has an associated cost in time and resources and can result in more complex visual output.

For example, computing systems, such as cloud-based data analytics platforms can allow users to perform cohort analysis. Cohort analysis can be thought of in varying ways, but one way is to consider a cohort analysis as a series of stages. A first stage may be a cohort selection stage which has a user develop a hypothesis and search for parameters to support or challenge the hypothesis. As such, a cohort selection stage includes an ontology-based parameter search carried out by the data analytics platform. A second stage can be a cohort building stage that allows a user, for example, to pull data sets and perform table join operations (e.g., SQL joins) that can be analyzed to support a desired outcome example. The cohort building stage uses the identified parameters defined by the cohort selection stage. A final stage of cohort analysis is the analysis stage which is typically the statistical analysis that takes into account the data that was built from the cohort building stage. In the cohort building stage, based on the ontology, a user may wish to join large amounts of data in the form of tables to link varying data sets in ways that are appropriate for the study. Complex sequential joins of tables can result in large numbers of rows of information that are difficult for a user to decipher. When data computing systems perform one-to-many joins the final result that is presented visually in the form of a user interface is typically a repetition of root object identifiers alongside corresponding large numbers of data rows that are data from the table that is being joined into a starting table.

For example, conventional user interfaces present table join outputs such as SQL joins in a resulting table that may look like the following Table 1. In this example, a patient set is used such that patient diagnosis has occurred and a grade has been given by a physician to the severity of the diagnosed condition, an SQL one-to-many join of tables may look like:

TABLE 1

| PATIENT ID | GRADE | SITE | DATE | PHYSICIAN | LOCATION |
|---|---|---|---|---|---|
| PATIENT ID 1524 | 3 | BRAIN | --/--/-- |  |  |
| PATIENT ID 1524 | 1 | LUNG | --/--/-- |  |  |
| PATIENT ID 1524 | 2 | SKIN | --/--/-- |  |  |
| PATIENT ID 1524 | 4 | SKIN | --/--/-- |  |  |
| PATIENT ID 1524 | 4 | BRAIN | --/--/-- |  |  |
| +7 MORE | | | | | |
| PATIENT ID 1100 | 3 | HEART | --/--/-- |  |  |
| PATIENT ID 1100 | 2 | BRAIN | --/--/-- |  |  |
| PATIENT ID 1100 | 1 | BRAIN | --/--/-- |  |  |
| PATIENT ID 1100 | 1 | HEART | --/--/-- |  |  |
| PATIENT ID 1100 | 1 | BRAIN | --/--/-- |  |  |

The example shown in Table 1 illustrates a left panel that includes root object rows (e.g., patient IDs) wherein the root object is repeated for each row. The root object row is the table that the join starts with and the incoming data rows are the data from the table that is being joined into the starting table. In the example in Table 1, the patient associated with Patent ID 1524 joins to 12 incoming data rows, whereas the patient associated with Patent ID 1100 joins to 5 rows.

As such, user interfaces that present the results of one-to-many table join operations on large data sets, such as those done as part of a cohort building operation or other operations, present large numbers of rows of data used in the join operations as well as visually repeating data in a way that makes the results confusing for a user to assess. Also, when a user tries to perform joins sequentially the displayed information can become even more difficult to understand. Hence, it is highly desirable to improve techniques for visualizing table join operations associated with large data sets.

3. SUMMARY

Certain embodiments of the present invention are directed to visualizing table join operations on data sets. More particularly, some embodiments of the present invention provide systems and methods for visualizing one or more data sets using root object rows having aggregated data from table join operations.

According to some embodiments, a method for visualizing one or more datasets includes importing a plurality of root objects, each root object including linked data attributes and obtaining a joined dataset based on the plurality of root objects, that includes for each or the plurality of root objects, a plurality of rows of related attribute data linked to each root object as a result of a join operation. In certain examples, the method includes performing an aggregation computation on the plurality of rows of related attribute data corresponding to each of the plurality of root objects to produce a corresponding single aggregation row of consolidated data for each root object and causing presentation of a user interface that presents each of the plurality of root objects with their corresponding single aggregation row of consolidated data resulting from the aggregation computation, in a one-to-one manner. In certain embodiments, the method includes allowing exporting of a dataset that includes each of the plurality of root objects and their associated single aggregation row of consolidated data after the aggregation computation has been performed. The method is carried out by one or more processors.

According to certain embodiments, a system for visualizing one or more datasets includes one or more processors and non-transitory memory including executable instructions stored therein that when executed causes the one or more processors to import a plurality of root objects, each root object including linked data attributes and obtain a joined dataset based on the plurality of root objects, that includes for each or the plurality of root objects, a plurality of rows of related attribute data linked to each root object as a result of a join operation. In some embodiments, the system performs an aggregation computation on the plurality of rows of related attribute data corresponding to each of the plurality of root objects to produce a corresponding single aggregation row of consolidated data for each root object and presents a user interface that shows each of the plurality of root objects with their corresponding single aggregation row of consolidated data resulting from the aggregation computation, in a one-to-one manner. In certain embodiments, the system allows exporting of a dataset that includes each of the plurality of root objects and their associated single aggregation row of consolidated data after the aggregation computation has been performed.

According to some embodiments, a non-transitory storage medium includes executable instructions that when executed causes one or more processors to import a plurality of root objects, each root object including linked data attributes, obtain a joined dataset based on the plurality of root objects, that includes for each or the plurality of root objects, a plurality of rows of related attribute data linked to each root object as a result of a join operation, perform an aggregation computation on the plurality of rows of related attribute data corresponding to each of the plurality of root objects to produce a corresponding single aggregation row of consolidated data for each root object, cause presentation of a user interface that presents each of the plurality of root objects with their corresponding single aggregation row of consolidated data resulting from the aggregation computation, in a one-to-one manner and allow exporting of a dataset that includes each of the plurality of root objects and their associated single aggregation row of consolidated data after the aggregation computation has been performed.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein.

Figure 4:
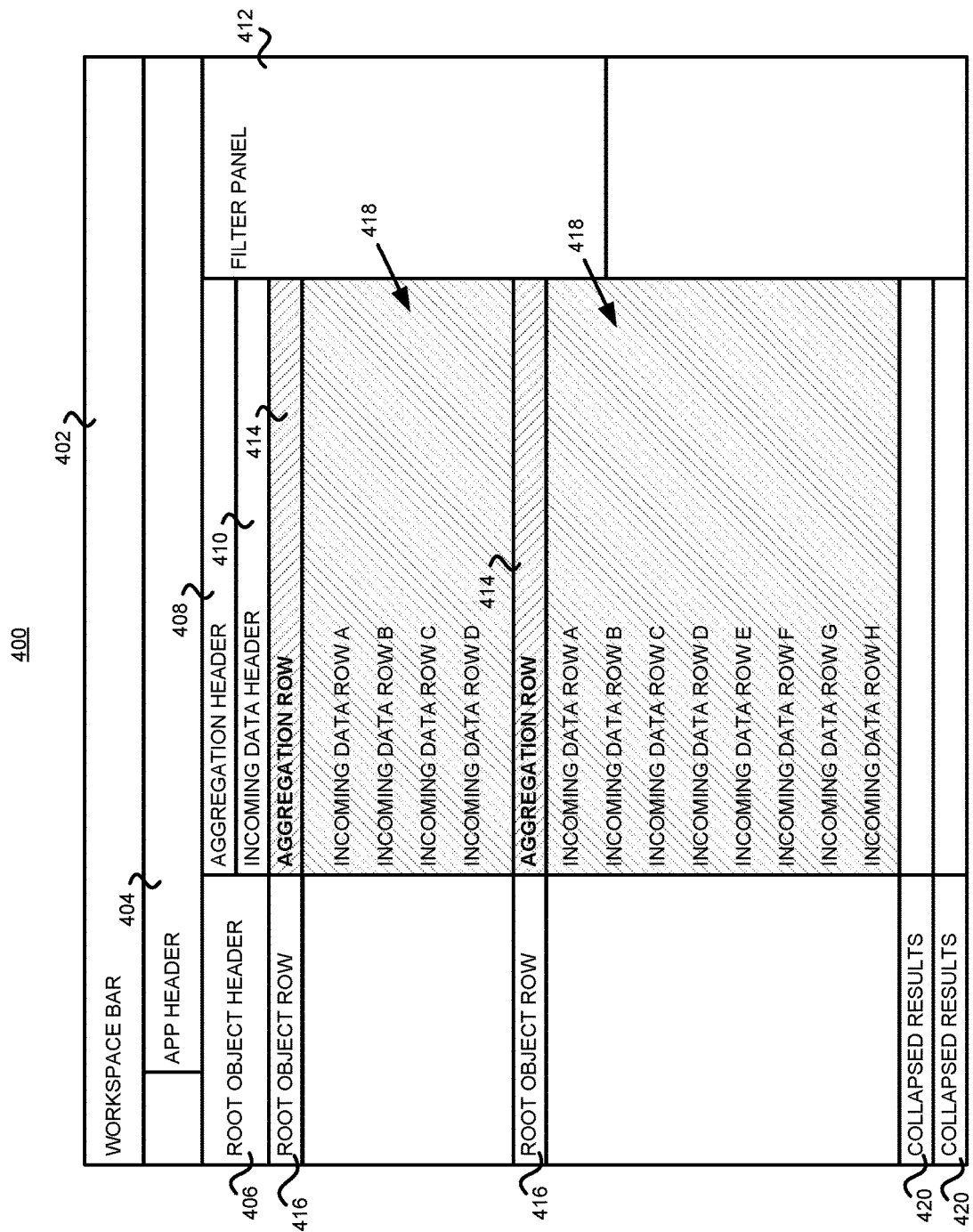
Figure 5:
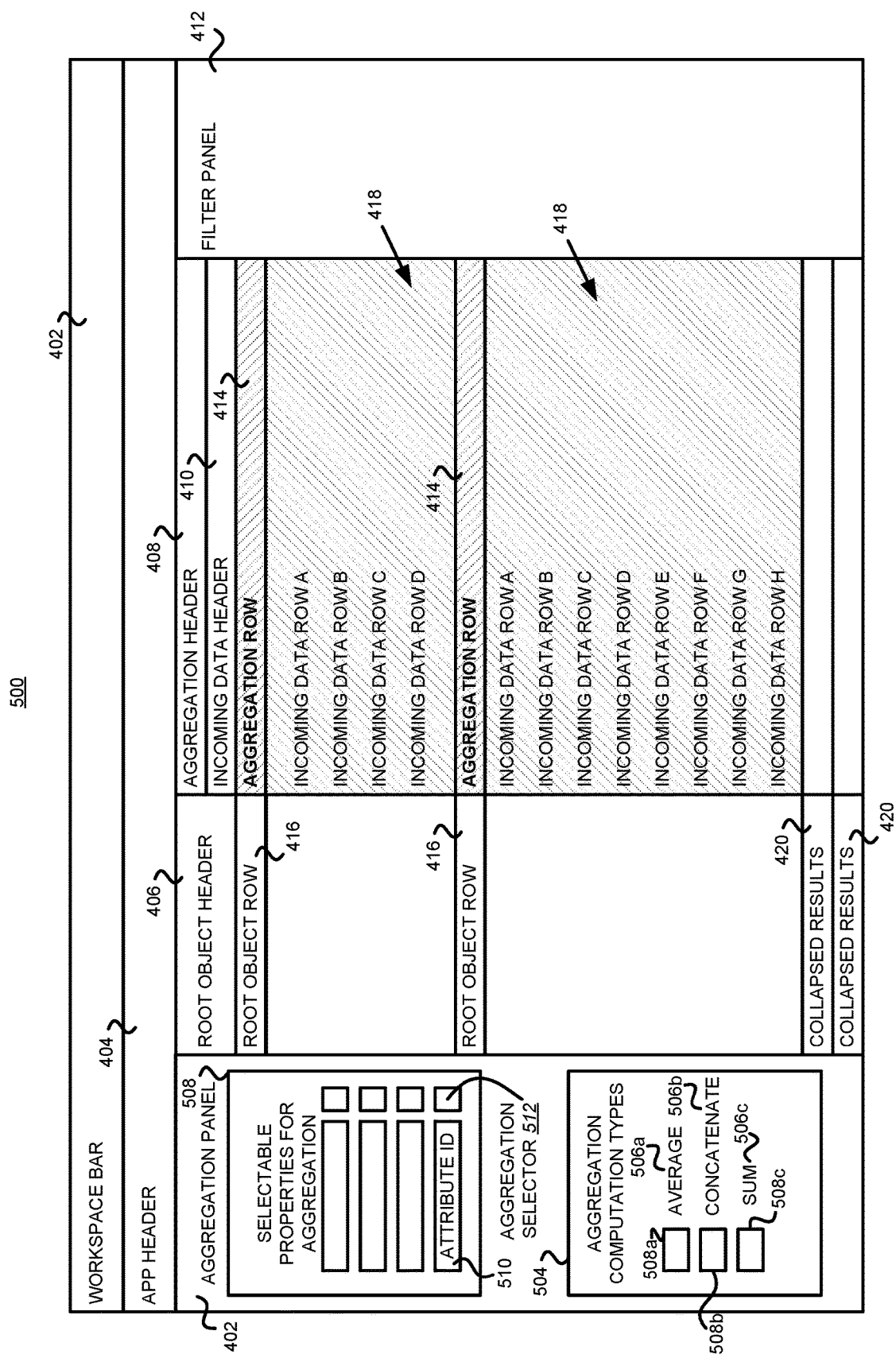
Figure 7:
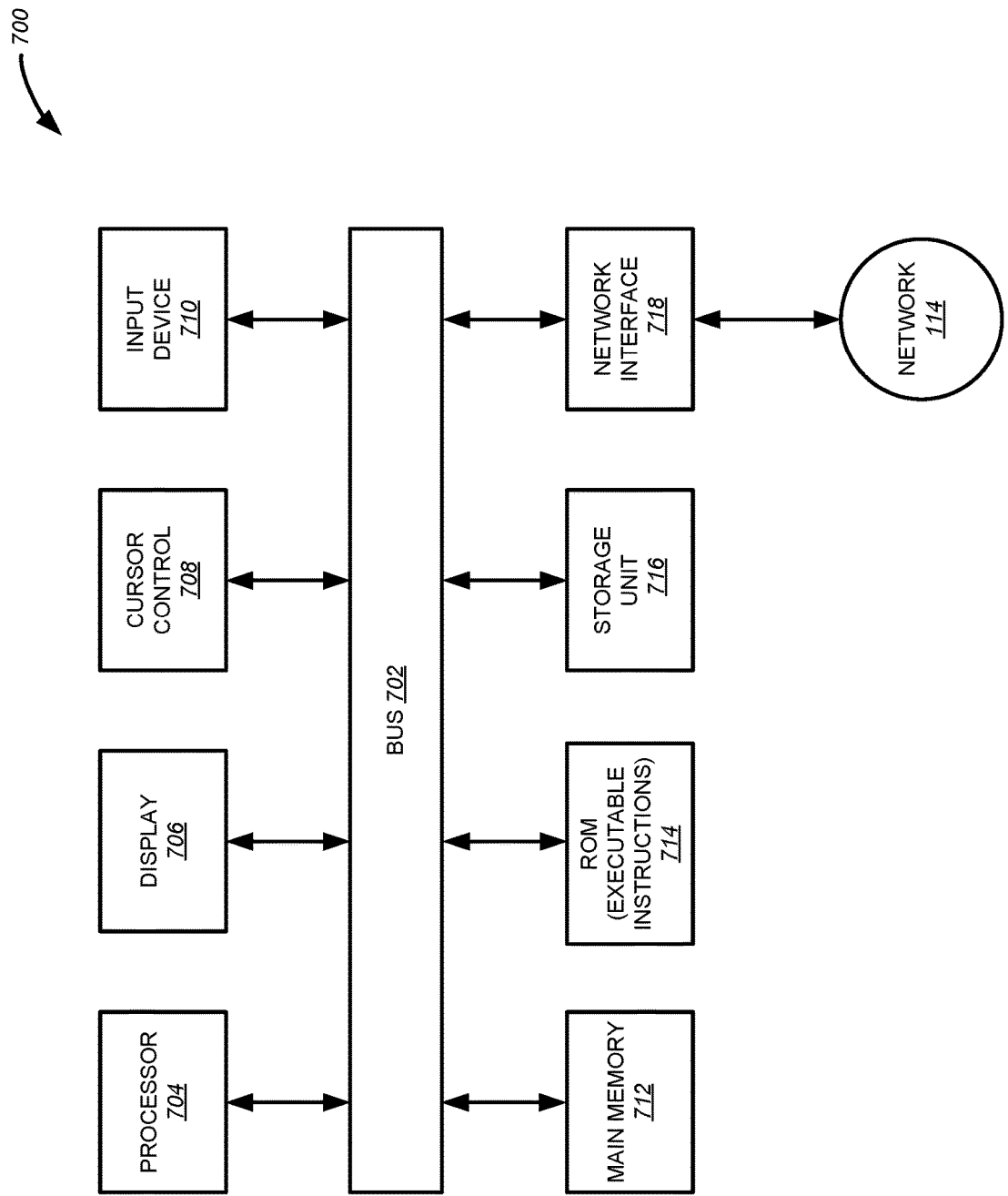

FIG. 4 diagrammatically illustrates one example of a user interface diagram for visualizing one or more data sets in accordance with the disclosure;

FIG. 5 diagrammatically illustrates another example of a user interface diagram for visualizing one or more data sets in accordance with the disclosure;

FIG. 6 diagrammatically illustrates one example of a user interface for visualizing one or more data sets in accordance with the disclosure; and FIG. 7 a simplified diagram showing a computing system for implementing a system for visualizing one or more data sets as one example set forth in the disclosure.

5. DETAILED DESCRIPTION

A challenge for many users is how exactly to resolve a one-to-many join into a one-to-one resulting table. As such, a pure SQL join would have the resulting table as illustrated in Table 1 above. This is very difficult for a user to understand and very complicated as more tables are joined sequentially.

According to certain embodiments of the disclosure, a type of cohort building application provides a user interface (UI) that presents a one-to-many join operation as a one-to-one table join by effectively forcing the aggregation of rows of related data (e.g., incoming data rows) from the one-to-many join, into a single aggregation row per root object. In some examples, the application treats the root object as a central root or base object for all table join operations and uses a back end to perform table joins. In certain examples, the application aggregates multiple rows of a one-to-many join in a way that results in each root object having a single row of related data with each row entry as a result from a forced user selected aggregation command. In some examples, the user interface allows selection of how the aggregation (e.g., selection of the type of aggregation) is to be performed but not whether aggregation will be done. In certain examples, aggregation is forced because exporting of the data set is not allowed until an aggregation is completed on the data set. In some examples, each root object is displayed in a UI with a single aggregation row having one or more columns depending on how many join operations are performed. In certain examples, once aggregated, the data set is allowed to be exported for storage and/or subsequent use.

In some embodiments, benefits include significant improvements, including for example, reduced complexity in managing iterations of data set generation resulting in reduced processing needs. Other benefits may include improved user experiences.

In certain embodiments, one or more solutions rooted in computer technology overcome one or more problems specifically arising in the realm of computer technology. Some embodiments are directed to computing platforms that include servers that provide access to applications to client devices through a browser-based user interface. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
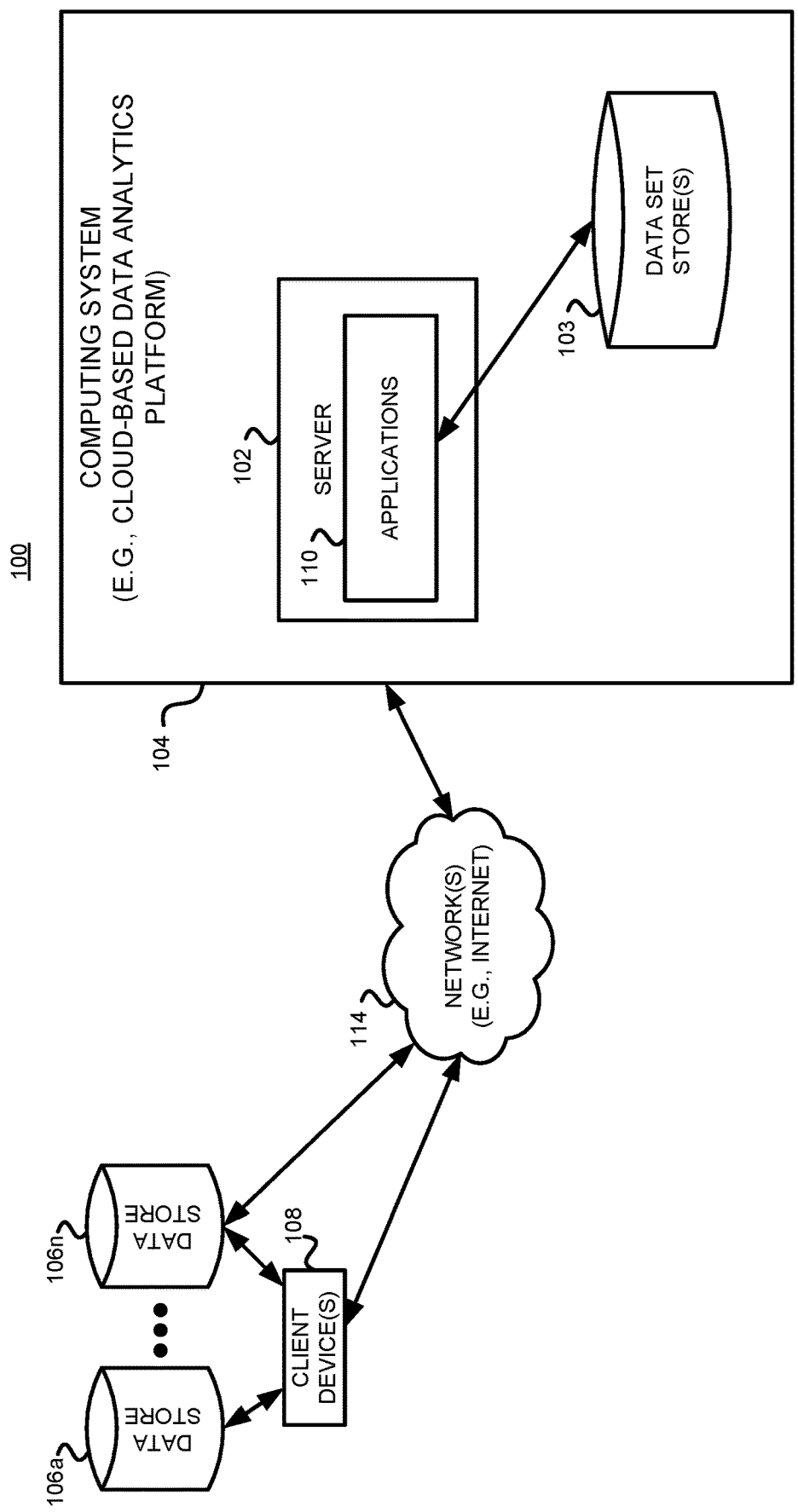
FIG. 1 is an example of a system for visualizing one or more data sets in accordance with one example set forth in the disclosure.

FIG. 1 is a simplified diagram showing a system 100 for visualizing one or more data sets according to one embodiment of the present disclosure. This diagram is merely an example, which should not unduly limit the scope of the claims. One of ordinary skill in the art would recognize many variations, alternatives, and modifications. The system 100 includes a server 102 that includes, in some implementations, an application server and database server, a data set store 103 that in this example is part of a computing system 104 such as a cloud-based data analytics platform, or any other suitable system. The system 100 also includes one or more client devices 108 that interface with one or more data stores 106a-106n and may be part of an enterprise. The client devices 108 can access the computing system 104 via one or more networks 114.

The data stores 106a-106n store data in various formats and types which are extracted under control of the computing system 104 to provide raw data that is analyzed, processed or otherwise transformed into one or more data sets that are stored in the data set store 103. The data set store 103 may be part of a database server subsystem. Likewise, the server 102 may be any suitable computing device and may be part of a server system within the computing system 104. In some examples, the server 102 includes one or more application servers that provide applications to perform operations on data sets as accessed by users of client devices, such as data analysts. The server 102 provides one or more applications 110 for the client device along with suitable user interfaces, such as graphical user interfaces, that are displayed on a display of the client device 108.

The applications 110 are stored in memory associated with the server 102 in the form of executable instructions that when executed by one or more processors of the server or computing system 104, causes the one or more processors to carry out the operations of the application. The computing system 104 includes any suitable operating systems, interfaces and any other components or services necessary for cloud-based computing, in some examples.

In certain implementations, the system 100 utilizes the computing system 104 for integrating, managing and interacting with data from different sources and formats. However, any suitable system may be employed. Each of the client device 108, server 102, computing system 104 may be implemented using the machine discussed in conjunction with FIG. 7 or multiple such machines operating in concert. The client device 108 may be a desktop computer, a laptop computer, a mobile phone, a tablet computer, a personal digital assistance, a smart watch, a smart television, a vehicle computer, and the like. The server 102 can be any suitable computing device and in some examples, is a component of a cloud-based data analytics platform but can be any suitable component that is part of any suitable configuration.

In some embodiments, the system 104 includes a cluster computing platform including one or more server or host machines. In some examples, the computing platform 104 includes a distributed computing platform that allows the one or more device clients 108 to distribute applications and/or data over the network 114 to a cluster of servers or host machines. In certain examples, the computing platform 104 includes a cloud computing platform that allows the one or more device clients 108 access to remote servers, data storages, networks, devices, applications and/or data resources over the network 114. For example, multiple users through the one or more client devices 108 store data at the data storages of the cloud computing platform (e.g., data set store 103). In other examples, the computing platform 108 is associated with a platform provider that provides the platform to multiple customers. For example, customers of the computing platform 104 include individuals, organizations and/or commercial companies.

In certain embodiments, the one or more servers or host machines are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing system 104 is configured to not replicate applications and/or resources across different regions. For example, each region is completely independent from any other region of the computing system 104.

According to some embodiments, the computing system 104 includes a container-orchestration platform. In some examples, the container-orchestration platform allows for automated deployment, scaling and/or operations of containers across the platform. For example, the container-orchestration platform employs the containers across one or more instances of the computing system 104.

According to certain embodiments, a container of the computing system 104 includes one or more applications. In some examples, the container also includes data and libraries associated with the one or more applications. For example, the container allows the one and more applications and their associated data and libraries to be co-located on the same server or host machine. In one example, the container allows the one and more applications and their associated data and libraries to share resources. For example, the shared resources include CPU, memory, storage, and/or networking capacity. As an example, the container represents the lowest level of a micro-service of the computing system 104. In one example, the micro-service includes the one or more applications, libraries and the applications' dependencies.

Figure 2:
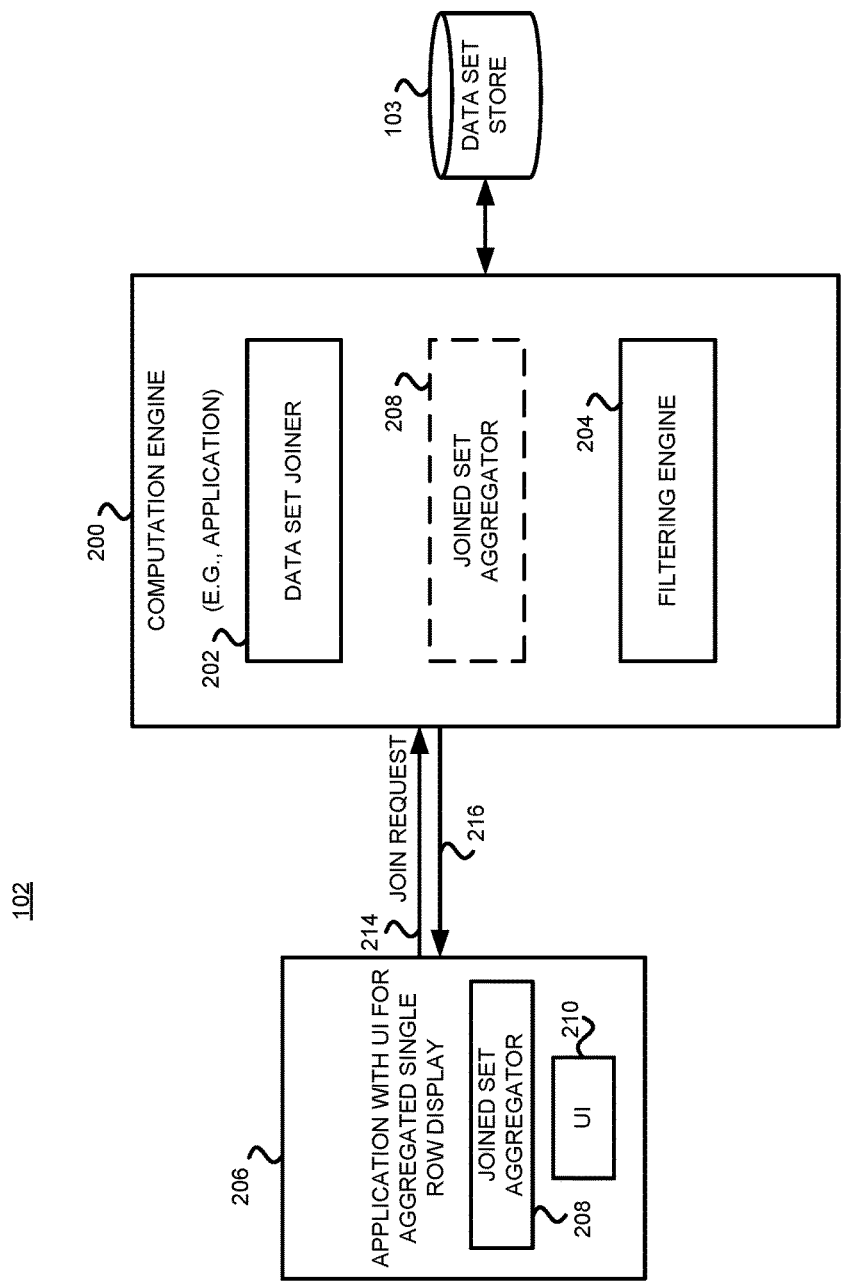
FIG. 2 is an example of a system for visualizing one or more data sets in accordance with one example set forth in the disclosure.

FIG. 2 illustrates one example of the server 102 that provides an application 200 that serves as a type of backend computation engine that performs table join operations, attribute filtering operations and any other suitable operations to generate one or more data sets based on user selection through one or more interfaces. In some implementations, the application 200 includes a data set joiner 202 and a filtering engine 204. The server 102 also includes, in this example, a second application 206 which in some implementations is a cohort building application that presents a user interface that provides a join visualization feature that displays a root object and a corresponding single aggregation row of consolidated data as further described herein. In one implementation, the application 206 provides a joined set aggregator 208 and user interface 210. The user interface 210 includes data that when presented on a display provides a visual user interface for a user. For purposes of illustration, the applications 200 and 206 will be described as one or more processors executing stored instructions that are stored in non-transitory memory such as RAM, ROM, or any suitable form of memory that stores executable instructions. The application 200 may also provide the joined set aggregator 208. Similarly, the application 206 may also provide the data set joiner and/or filtering engine 204 if desired. The application 200 and 206 may be in other forms as well including one or more APIs, services, or any other suitable form to carry out operations as described herein.

The client device 108 presents the user interface 210 which in some implementations is a browser-based user interface. In some implementations, the applications 200 and 206 include processes that communicate with one another over a network in order to fulfill a goal. The applications may correspond to different applications at different uniform resource locators (URLs).

The computing system 104 employs the server 102 in some implementations for visualizing one or more data sets. In some implementations, the server 102 through the application 206 imports a plurality of root objects such as those associated with a root node in a search node tree, or any other root object-based data configuration, wherein each root object includes linked data attributes. For example, root objects may be a set of patients and each patient may have linked attributes associated with the root object such as treatment information, diagnosis information, age, gender, or any other suitable attributes. In other examples, the root objects may be aircraft having attributes such as component parts of the aircraft, miles flown, age, or any other suitable attributes. It will be recognized that any suitable data may be used as the root object and corresponding attributes. As such, the disclosed visualization technique may be employed with any suitable data. The imported root objects in one example may be the result of an initial cohort selection process and stored in the data set store 103. However, any other grouping of root objects may be employed. In some examples, the root objects are organized and linked to attributes based on an ontology defined by the computing system 104. The server 102 in some implementations obtains a joined data set from the application 200 based on the root objects.

In certain implementations, the imported root objects and associated attribute data is the result of a table join operation. In some implementations, the user through user interface 210 selects attributes of the root object to be joined as part of a table join operation and sends a join request 214 to the application 200. The application 200 performs a table join computation using the data set joiner 202 and joins the tables identified as part of the join request 214. The resulting joined data set 216 is received as a reply to the request. The joined data set 216 includes, for each of the root objects, a plurality of rows of related attribute data linked to each root object as a result of a join operation.

Figure 3:
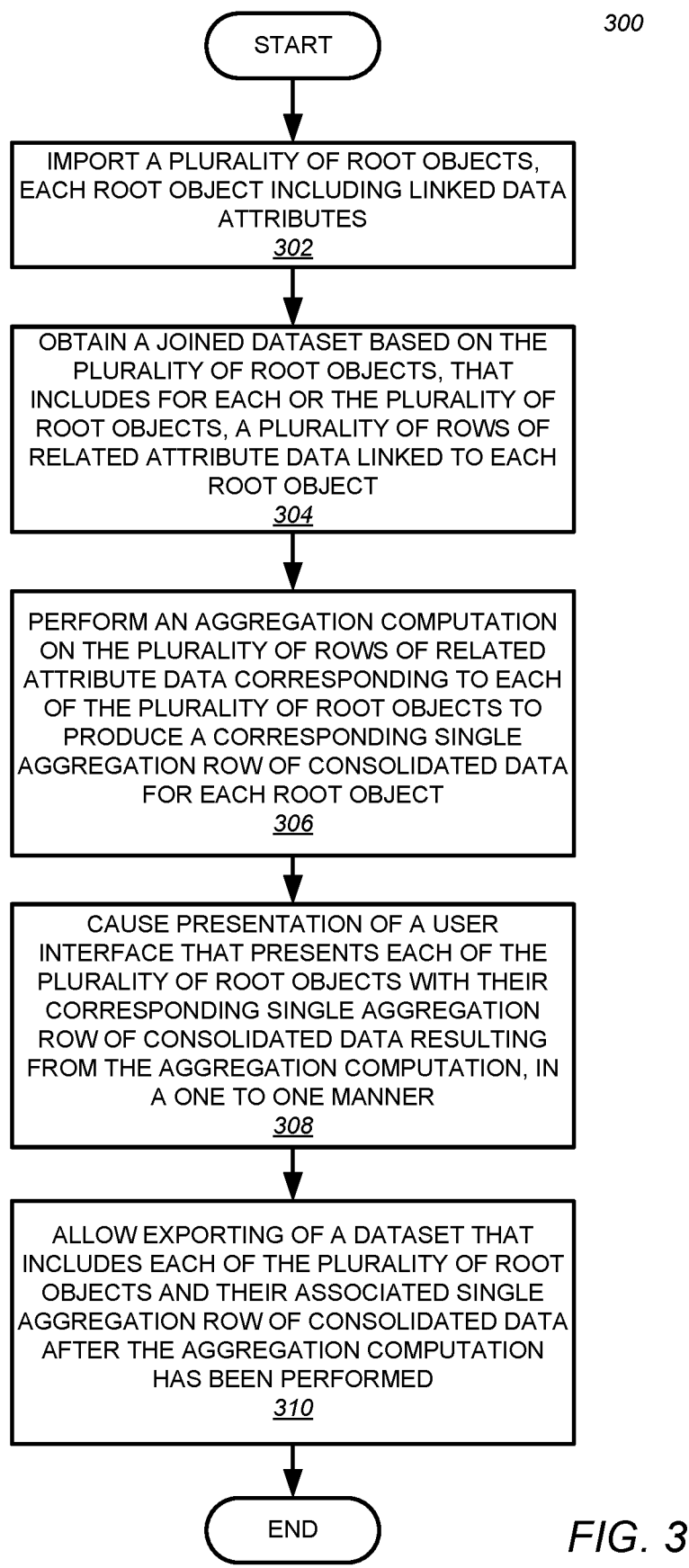
FIG. 3 is a flowchart illustrating one example of a method for visualizing one or more data sets in accordance with the disclosure.

Referring also to FIG. 3, which is a simplified diagram showing a method 300 for visualizing one or more data sets according to one embodiment of the present disclosure, the operation of the server 102 will be further described. The diagram of FIG. 3 is merely an example, which should not unduly limit the scope of the claims. One of ordinary skill in the art would recognize many variations, alternatives and modifications. As shown in block 302, the method includes importing the plurality of root objects wherein each root object includes linked data attributes. In some implementations, this is done through the user interface 210 and a user selecting from a menu, in one example a set of root objects to be operated on. In some implementations, one set of root objects are selected, the user interface 210 displays as another screen, a column (e.g., panel) of root objects along with columns of each linked attribute for those objects displayed in corresponding rows for each root object. For example, the user interface 210, in an example displays a table having a column of root objects and each of their corresponding linked data attributes are shown in other columns. The user interface 210 includes an interface menu to select attributes to join which may be implemented in any suitable manner such as, but not limited to, a selectable listing of the attributes which when selected, causes a table joining operation such as an SQL table join operation to occur with the selected attributes. The result is a joined data set generated by the application 200 and sent back to application 206 for display. The joining in some implementations is done by the data set joiner 202 using conventional joining techniques.

As shown in block 304, the system 102 obtains the joined data set 216 that includes for each of the plurality of root objects, a plurality of rows of related attribute data linked to each root object. In certain implementations, as shown in block 306 the system through application 206, performs an aggregation computation on the plurality of rows of related attribute data corresponding to each of the plurality of root objects to produce a corresponding single aggregation row of consolidated data for each root object. In some implementations, the user interface allows a user to select the type of aggregation to perform on the data. As shown in block 308, in some implementations, the application 206 causes presentation of the user interface that presents each of the plurality of root objects with their corresponding single aggregation row of consolidated data resulting from the aggregation computation, in a one-to-one manner. As shown in block 310, the method includes allowing exporting of a data set that includes each of the plurality of root objects and their associated single aggregation row of consolidated data after the aggregation computation has been performed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 300 are performed by the system 100. In certain examples, some or all processes (e.g., steps) of the method 300 are performed by a computer and/or a processor directed by a code. For example, a computer includes a server computer and/or a client computer (e.g., a personal computer). In some examples, some or all processes (e.g., steps) of the method 300 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or a server rack).

FIG. 4 illustrates one example of a user interface diagram that illustrates one example format of the user interface 210 in accordance with one embodiment of the disclosure. This diagram is merely an example which should not unduly limit the scope of the claims. One of ordinary skill in the art would recognized many variations, alternatives and modifications. In this example, the user interface diagram 400 is the template format for the user interface 210 and is populated with the data for the various root objects, the aggregated data, and linked attributes from a join operation and other data. In this example, the user interface 210 includes a portion 402 that serves as a workspace bar, a portion 404 that serves as an application header that displays text identifying the particular join request or response to the join request, a portion 406 to display a root object header such as text identifying the general category of root objects, an aggregation header portion 408 that displays the types of aggregation used for aggregating rows, an incoming data header portion 410 such as text identifying each of the attributes for the corresponding root objects, a filter panel portion 412 that includes filter selection data to allow a user to select from a plurality of different filters to filter attributes prior to an aggregation operation. In addition, the user interface diagram 400 includes an aggregation row portion 414 directly to the right of a portion 416 for the root object row. The aggregation row portion 414 is distinct from an incoming data row portion 418 which displays incoming data rows. Each root object row portion 416 in this example, is on the left side of the join only once aggregation row portion 414. The joined data is displayed in the incoming data rows 418 but the root object row is not repeated for each incoming data row. As illustrated, the row in this example directly to the right of the root object row 416 namely aggregation row 414 is distinct from the incoming data 418. The aggregation row 414 is populated with the result of an aggregation being run on the incoming data, on a per unique root object basis, and effectively forces a user to resolve a join to a 1:1. In some implementations, users do not choose whether to aggregate the incoming data rows, but instead the users are allowed to choose how to aggregate the incoming rows from a join operation.

The user interface displays selectable filter type data in the filter panel 412 that allows a user to select from a plurality of different types of filters to perform the filtering of the plurality of rows on a per-root object basis, such as prior to performing an aggregation computation. The filter panel provides a selection of the filter type to be applied to the attribute data and in some implementations, the application 206 then performs the filtering of the rows on a per-root object basis to reduce the number of rows into a remaining group of rows on a per-root object basis. In certain implementations, the application 206 sends a request for filtering to the application 200 which uses the filtering engine 204 to filter the attributes.

In this example, a portion for collapsed results 420 may also be employed if desired. Also shown, the system provides a user interface wherein the portion 418 that displays the plurality of rows of related attribute data linked to each root object from a one-to-many table join is presented in a lower highlighted relationship compared to the single aggregation rows portion 414 that are to the right of the root object row. For example, the highlighting, which can be any mechanism used to have the text more pronounced, is chosen so that the aggregation row data in portion 414 is visually more prevalent to the user than the rows of data in portion 418 that includes the related attribute data that is linked to the root object as a result of a one-to-many table join operation. It will be recognized that the various portions and panels need not be displayed at the same time and may be displayed in response to different user input selections as needed.

FIG. 5 illustrates another example of a user interface diagram 500 used by the application 206 wherein an aggregation panel 502 is presented to allow a user to select how an aggregation of a result of rows of data resulting from table join operation are to be aggregated into a single aggregation row that is displayed alongside a single root object row. This diagram is merely an example which should not unduly limit the scope of the claims. One of ordinary skill in the art would recognized many variations, alternatives and modifications. In certain implementations, the aggregation panel 502 presents aggregation type selection data 504 that allows a user to select from a plurality of different types of aggregation operations shown as 506a-506c to apply to the rows of related attribute data for each of the root objects. In this example, the aggregation operations are applied to the rows of related attribute data displayed in portions 418 for the respective root objects. The presentation of the aggregation type selection data may be implemented in any suitable fashion including pull-down menus, text with associated selection buttons 508a-508c or in any other suitable manner.

In some implementations, the user interface also includes aggregation selection data 508 through the aggregation panel 402 that allows a user to select from a plurality of different displayed attributes corresponding to the incoming header data 410 that are linked to the root objects. In this example, an attribute identifier 510 is displayed for each attribute that is displayed in the user interface and an aggregation selector 512 such as a GUI button or any other suitable mechanism allows user selection of the attribute data or properties that are to be aggregated. In some examples, aggregation of the values in the incoming data rows are through summing, concatenating, or aggregated in some other aggregation operation as further described below. The aggregation header 408 displays the type of aggregation computation that has been selected from the aggregation computation type portion 504. It will be recognized that the various portions and panels need not be displayed at the same time and may be displayed in response to different user input selections as needed.

FIG. 6 is a diagram illustrating one example of a user interface for visualizing one or more data sets in accordance with one embodiment of the present disclosure. This diagram is merely an example which should not unduly limit the scope of the claims. One of ordinary skill in the art would recognized many variations, alternatives and modifications. In this example, a medical data ontology is employed wherein patients have undergone diagnosis and treatments by physicians at certain locations on certain dates. Some patients may have been diagnosed with a condition related to the brain, lung, skin, heart and in some examples, the same patient has been diagnosed with multiple conditions. This is an example only for illustration purposes to help explain the user interfaces being populated with data. As seen, a one-to-one resulting table on a per-patient basis (per-root object basis) is shown such that the application 206, in some implementations causes the presentation of a user interface 600 that presents each of the plurality of root objects 602a-602e with their corresponding single aggregation row of consolidated data 604a-604e respectively. Filtering on incoming data rows is an option if desired through the filter panel options and filtering is done, for example, on a per-root object basis. In this example, when a filter operation is selected, filtering will be done on a per-patient rather than across the entire data set (e.g., using filtering engine 204). An aggregation is a computation that takes many inputs such as the many different tumor grades in this example, and aggregates or collapses them into a single output such as by taking the average grade or concatenating multiple values. Filtering in one example will take the maximum grade per patient rather than aggregating which will take the average. As illustrated, the graphic user interface 600 does not show the root objects (e.g., patient IDs) written over and over again for each row of related data but instead shows each root object on the left of the join only once.

In this example, the ordering of the root objects, namely the patient IDs, are done accordingly to join cardinality. For example, a one-to-twelve join results are depicted in the table before the one-to-five results, one-to-one results are grouped together and collapsed, and one-to-zero are also grouped and collapsed at the bottom of the screen. As such, join cardinality is used as a proxy for the most difficult join result and is displayed first. The aggregation row 414 in this example, illustrates a concatenation of the diagnoses that are resulting from the multiple related data rows. In this example as well, multiple aggregations have been selected, namely aggregation of the diagnosis column (brain, lung, skin) also referred to as site, as well as aggregating using a maximum grade from the grade column. This is a result of two aggregation requests being requested on the rows of related attribute data. As such, the resulting user interface presents a table with one row per patient through the required aggregation operation. The user can then do another join immediately after an aggregation with the same user interface and retain the same characteristics from a visual perspective. Rather than sequential one-to-many joins causing a large explosion in complexity, the visual representation through the user interface resolves each join to a 1:1 via aggregation and allows the aggregation row to maintain a single row per-root object but having multiple columns 610 and 612 of aggregation data.

Filtering of rows on a per-root object basis reduces the number of rows into a remaining group of rows on a per-root object basis. To aggregate, the user is required to select through the aggregation selection type data, for the remaining groups of rows, and produces the single aggregation row of consolidated data 414 and in this specific example, the data 604 results. As can be seen, there are two different aggregations performed, namely a max grade aggregation and a concatenation aggregation. These are two functions that aggregate the grade and site columns. The results are shown as 610 and 612.

Stated another way, in certain examples systems and methods perform another table joining operation with the root object rows and other related data based on another user join request such that each of the plurality of root objects are linked to multiple related data rows in a one-to-many relationship. The system and method perform another aggregation computation on the multiple data rows to produce a second condensed single aggregation row entry corresponding to each root object row; and combine the second condensed single row entry and the exported first condensed single aggregation row entry with a corresponding root object into a single root object row including a root object identifier, the first condensed single aggregation row entry (e.g., as a first column of the aggregation row) and the second condensed single aggregation row entry (e.g., as a second column of the aggregation row).

In some examples, the user interface that is presented to the user such as user interface 600, includes export selection data, such as buttons or any other suitable interface mechanism that allows only exportation of one or more data sets that include root objects with their corresponding single aggregation row of consolidated data that results from the aggregation computation. As such, in certain implementations, data sets resulting from aggregations are the only type of data sets that are allowed to be exported from the application to row 6. The joined set aggregator 208 performs the aggregation operations that are selected through the user interface. In other examples, the application 206 can request that the application 200 perform the selected aggregation operations so that the backend engine performs not only the table joining operations and filtering operations but also the aggregation operations if desired. However, any suitable sharing of operations can be employed between the applications or other system components depending upon the architecture of the system.

FIG. 7 is a simplified diagram showing a computing system for implementing a system for visualizing one or more data sets according to one embodiment of the present disclosure. This diagram is merely an example, which should not unduly limit the scope of the claims. One of ordinary skill in the art would recognize many variations, alternatives, and modifications. The computing system 700 includes a bus 702 or other communication mechanism for communicating information, a processor 704, a display 706, a cursor control component 708, an input device 710, a main memory 712, a read only memory (ROM) 714, a storage unit 716, and a network interface 718. In some embodiments, some or all processes (e.g., steps) of the method 400, the method 500, and/or the method 600 are performed by the computing system 700. In some examples, the bus 702 is coupled to the processor 704, the display 706, the cursor control component 708, the input device 710, the main memory 712, the read only memory (ROM) 714, the storage unit 716, and/or the network interface 718. In certain examples, the network interface is coupled to a network 114. For example, the processor 704 includes one or more general purpose microprocessors. In some examples, the main memory 712 (e.g., random access memory (RAM), cache and/or other dynamic storage devices) is configured to store information and instructions to be executed by the processor 704. In certain examples, the main memory 712 is configured to store temporary variables or other intermediate information during execution of instructions to be executed by processor 704. For examples, the instructions, when stored in the storage unit 716 accessible to processor 704, render the computing system 700 into a special-purpose machine that is customized to perform the operations specified in the instructions. In some examples, the ROM 714 is configured to store static information and instructions for the processor 704. In certain examples, the storage unit 716 (e.g., a magnetic disk, optical disk, or flash drive) is configured to store information and instructions.

In some embodiments, the display 706 (e.g., a cathode ray tube (CRT), an LCD display, or a touch screen) is configured to display information to a user of the computing system 700. In some examples, the input device 710 (e.g., alphanumeric and other keys) is configured to communicate information and commands to the processor 704. For example, the cursor control 708 (e.g., a mouse, a trackball, or cursor direction keys) is configured to communicate additional information and commands (e.g., to control cursor movements on the display 706) to the processor 704.

In certain embodiments, a method for visualizing one or more datasets includes importing a plurality of root objects, each root object including linked data attributes and performing a join operation on selected attributes. The method includes obtaining a joined dataset based on the plurality of root objects, that includes for each or the plurality of root objects, a plurality of rows of related attribute data linked to each root object as a result of the join operation and performing an aggregation computation on the plurality of rows of related attribute data corresponding to each of the plurality of root objects to produce a corresponding single aggregation row of consolidated data for each root object. The method includes causing presentation of a user interface that presents each of the plurality of root objects with their corresponding single aggregation row of consolidated data resulting from the aggregation computation, in a one-to-one manner and allowing exporting of a dataset that includes each of the plurality of root objects and their associated single aggregation row of consolidated data after the aggregation computation has been performed wherein the method is carried out by one or more processors. For example, the method is implemented according to at least FIG. 1, FIG. 2, FIG. 3, FIG. 4, FIG. 5, FIG. 6 and/or FIG. 7.

In some examples, the method includes filtering the plurality of rows on a per root object basis to reduce the number of rows into a remaining group of rows on a per root object basis and wherein the performing the aggregation computation includes performing an aggregation computation on the remaining group of rows corresponding to each of the plurality of root objects to produce, for each root object, a single aggregation row of consolidated data.

In certain examples, the method includes providing the user interface to include selectable filter type data that allows a user to select from a plurality of different types of filters to perform the filtering of the plurality of rows on a per root object basis. In some examples, the method includes providing the user interface to include aggregation type selection data that allows a user to select from a plurality of different types of aggregation operations to apply to the plurality of rows of related attribute data. In certain examples, the method includes providing the user interface to include aggregation selection data that allows a user to select from a plurality of different attributes linked to the root object for an aggregation operation to be applied to the plurality of rows of related attribute data.

In some examples, the method includes providing the user interface to include: a portion that displays rows of root objects, each root object displayed only once amongst the rows of root objects regardless of a number of related attribute data linked to each root object as a result of the join operation, a portion that displays corresponding single aggregation rows for each root object in a same row as the root object, a portion that displays the plurality of rows of related attribute data linked to each root object from a one-to-many table join, in a lower highlighted relationship compared to the single aggregation rows, and selectable aggregation type selection data that allows a user to select how to aggregate the plurality of rows of related attribute data.

In certain examples, the method includes providing the user interface to include export selection that allows only exportation of one or more data sets that include root objects with their corresponding single aggregation row of consolidated data resulting from the aggregation computation, in a one-to-one manner.

In some embodiments, a system for visualizing one or more datasets includes one or more processors and non-transitory memory including executable instructions stored therein that when executed causes the one or more processors to import a plurality of root objects, each root object includes linked data attributes and obtain a joined dataset based on the plurality of root objects, that includes for each or the plurality of root objects, a plurality of rows of related attribute data linked to each root object as a result of a join operation. The system also performs an aggregation computation on the plurality of rows of related attribute data corresponding to each of the plurality of root objects to produce a corresponding single aggregation row of consolidated data for each root object and causes presentation of a user interface that presents each of the plurality of root objects with their corresponding single aggregation row of consolidated data resulting from the aggregation computation, in a one-to-one manner and allow exporting of a dataset that includes each of the plurality of root objects and their associated single aggregation row of consolidated data after the aggregation computation has been performed. For example, the system is implemented according to at least FIG. 1, FIG. 2, FIG. 3, FIG. 4, FIG. 5, FIG. 6 and/or FIG. 7.

In some examples, the memory includes executable instructions that when executed causes the one or more processors to filter the plurality of rows on a per root object basis to reduce the number of rows into a remaining group of rows on a per root object basis and performing the aggregation computation by performing an aggregation computation on the remaining group of rows corresponding to each of the plurality of root objects to produce, for each root object, a single aggregation row of consolidated data.

In certain examples, the memory includes executable instructions that when executed causes the one or more processors to provide the user interface to include selectable filter type data that allows a user to select from a plurality of different types of filters to perform the filtering of the plurality of rows on a per root object basis.

In some examples, the memory includes executable instructions that when executed causes the one or more processors to provide the user interface to include aggregation type selection data that allows a user to select from a plurality of different types of aggregation operations to apply to the plurality of rows of related attribute data.

In certain examples, the memory includes executable instructions that when executed causes the one or more processors to provide the user interface to include aggregation selection data that allows a user to select from a plurality of different attributes linked to the root object for an aggregation operation to be applied to the plurality of rows of related attribute data.

In some examples, the memory includes executable instructions that when executed causes the one or more processors to provide the user interface to include: a portion that displays rows of root objects, each root object displayed only once amongst the rows of root objects regardless of a number of related attribute data linked to each root object as a result of the join operation, a portion that displays corresponding single aggregation rows for each root object in a same row as the root object, a portion that displays the plurality of rows of related attribute data linked to each root object from a one-to-many table join, in a lower highlighted relationship compared to the single aggregation rows, and selectable aggregation type selection data that allows a user to select how to aggregate the plurality of rows of related attribute data.

In certain examples, the user interface is provided to present the root objects and corresponding single aggregation rows for each root object in a same row as the root object and displayed in an order of join cardinality.

In some examples, the memory includes executable instructions that when executed causes the one or more processors to provide the user interface to include export selection that allows only exportation of one or more data sets that include root objects with their corresponding single aggregation row of consolidated data resulting from the aggregation computation, in a one-to-one manner.

In certain implementations, a non-transitory storage medium includes executable instructions that when executed causes the one or more processors to import a plurality of root objects, each root object including linked data attributes and obtain a joined dataset based on the plurality of root objects, that includes for each or the plurality of root objects, a plurality of rows of related attribute data linked to each root object as a result of a join operation. The storage medium includes executable instructions to perform an aggregation computation on the plurality of rows of related attribute data corresponding to each of the plurality of root objects to produce a corresponding single aggregation row of consolidated data for each root object and cause presentation of a user interface that presents each of the plurality of root objects with their corresponding single aggregation row of consolidated data resulting from the aggregation computation, in a one-to-one manner. The storage medium includes executable instructions to allow exporting of a dataset that includes each of the plurality of root objects and their associated single aggregation row of consolidated data after the aggregation computation has been performed. For example, the memory includes executable instructions to carry out operations depicted according to at least FIG. 1, FIG. 2, FIG. 3, FIG. 4, FIG. 5, FIG. 6 and/or FIG. 7.

In certain examples, the memory includes executable instructions that when executed causes the one or more processors to filter the plurality of rows on a per root object basis to reduce the number of rows into a remaining group of rows on a per root object basis and perform the aggregation computation by performing an aggregation computation on the remaining group of rows corresponding to each of the plurality of root objects to produce, for each root object, a single aggregation row of consolidated data.

In some examples, the storage medium includes executable instructions that when executed causes the one or more processors to provide the user interface to include selectable filter type data that allows a user to select from a plurality of different types of filters to perform the filtering of the plurality of rows on a per root object basis.

In certain examples, the storage medium includes executable instructions that when executed causes the one or more processors to provide the user interface to include aggregation type selection data that allows a user to select from a plurality of different types of aggregation operations to apply to the plurality of rows of related attribute data.

In some examples, the storage medium includes executable instructions that when executed causes the one or more processors to provide the user interface to include aggregation selection data that allows a user to select from a plurality of different attributes linked to the root object for an aggregation operation to be applied to the plurality of rows of related attribute data.

In certain examples, the storage medium includes executable instructions that when executed causes the one or more processors to provide the user interface to include: a portion that displays rows of root objects, each root object displayed only once amongst the rows of root objects regardless of a number of related attribute data linked to each root object as a result of the join operation, a portion that displays corresponding single aggregation rows for each root object in a same row as the root object, a portion that displays the plurality of rows of related attribute data linked to each root object from a one-to-many table join, in a lower highlighted relationship compared to the single aggregation rows, and selectable aggregation type selection data that allows a user to select how to aggregate the plurality of rows of related attribute data.

In some implementations, the system and methods provide for the importing of a set of root objects such as a set of patients, set of aircraft or any other suitable root object data and importing linked data for each patient such as attribute data for root objects that result from a table join operation. The user interface in some implementations allows the user to filter the attribute data to reduce the number of data rows for each root object. The system and methods, for example through the user interface allow a user to consolidate or aggregate data from remaining rows for each patient by performing an aggregation operation on the data selected by the user. The aggregated data is then placed in the same row, in some implementations, as the root object so a 1:1 relationship is shown on a per-root object basis. The user interface in some examples includes selectable data to allow the user to export the consolidated column information which has become a cell of the displayed table, so that additional data sets can be generated using the consolidated row information in other data set analyses processes.

In some implementations, the columns in the table which are the attribute data are selectable for each root object and can then be aggregated using a selected aggregation function, such as an average, concatenation operation, or any other suitable aggregation function.

In some examples, systems and methods import a patient set in the form of a set of patient root objects, import data for each patient in the set in the form of a plurality of incoming data rows linked to each respective patient root object and for each patient root object, generate and present a single row of consolidated attribute data (e.g., properties of the root object) from respective plurality of incoming data rows.

In certain examples, systems and methods for visualizing one or more datasets include importing a first table of data that includes a plurality of root object rows, receiving, through a user interface, a selection of a second table of related data to be joined with the first table of data, obtaining a joined first table with the second table of related data (e.g., properties of root object) such that each of the plurality of root objects are linked to multiple related data rows in a one-to-many relationship. In response to a received aggregation command through the user interface, the systems and methods perform an aggregation computation on the multiple data rows corresponding to each of the plurality of root objects to produce a first condensed single aggregation row entry corresponding to each root object row and present in the user interface, each of the plurality of root object rows in conjunction with the first condensed single aggregation row entry, in a one-to-one relationship. The methods are carried out by one or more processors.

In some examples, systems and methods include displaying each of the plurality of root object rows as a single row having a root object identifier and a corresponding first single aggregation row entry (e.g., an aggregation row on a per root object basis). In certain examples systems and methods export the produced single aggregation row entry and corresponding root object for each of the plurality of root object rows as a cohort data set.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for visualizing one or more datasets, the method comprising:
   obtaining a joined dataset based on a plurality of root objects that comprises, for each of the plurality of root objects, a plurality of rows of related attribute data linked to each root object as a result of a join operation, each root object of the plurality of root objects comprising a join cardinality;
   providing a user interface to present aggregation type selection data that allows a user to select one or more aggregation types from a plurality of different types of aggregation operations to apply to the plurality of rows of related attribute data;
   performing an aggregation computation of the one or more selected aggregation types on the plurality of rows of related attribute data corresponding to each root object of the plurality of root objects to produce a corresponding single aggregation row of consolidated data for each root object, the consolidated data comprising an average of the plurality of rows of related attribute data corresponding to each root object or a first attribute data from the plurality of rows of related attribute data appended next to a second attribute data from the plurality of rows of related attribute data; and
   causing presentation of the user interface that presents each root object of the plurality of root objects with the corresponding single aggregation row of consolidated data resulting from the aggregation computation, the plurality of root objects being ordered on the user interface based on the join cardinality of each root object of the plurality of root objects;
   wherein the method is carried out by one or more processors, and
   wherein at least one of the one or more selected aggregation types comprise a concatenation operation, the concatenation operation comprising appending the first attribute data to the second attribute data, and the consolidated data comprising the first attribute data from the plurality of rows of related attribute data appended next to the second attribute data from the plurality of rows of related attribute data.

2. The method of claim 1, wherein the join cardinality for each root object of the plurality of roots objects corresponds to a number of rows of the plurality of rows of related attribute data linked to a respective root object of the plurality of root objects.

3. The method of claim 1, wherein a plurality of single aggregation rows with join cardinalities of one are grouped together, and wherein the causing presentation of the user interface comprises collapsing the plurality of single aggregation rows that are grouped together into a single collapsed row.

4. The method of claim 1, further comprising:
exporting of a dataset that comprises the plurality of root objects ordered based on the join cardinality of each root object, and the corresponding single aggregation row of consolidated data after the aggregation computation has been performed.

5. The method of claim 1, wherein the corresponding single aggregation row of consolidated data further comprises concatenation data generated by applying the concatenation operation to the plurality of rows of related attribute data corresponding to each root object.

6. The method of claim 1, wherein the one or more aggregation types comprise a maximum value operation, wherein the aggregation row comprise a maximum value generated by applying the maximum value operation to the plurality of rows of related attribute data corresponding to each root object, and wherein the maximum value is a single numeric value.

7. A system comprising:
a processor; and
memory storing instructions that, when executed by the processor, causes the system to perform a set of operations, the set of operations comprising:
obtaining a joined dataset based on a plurality of root objects, that comprises, for each of the plurality of root objects, a plurality of rows of related attribute data linked to each root object as a result of a join operation, each root object of the plurality of root objects comprising a join cardinality;
providing a user interface to present aggregation type selection data that allows a user to select one or more aggregation types from a plurality of different types of aggregation operations to apply to the plurality of rows of related attribute data;
performing an aggregation computation of the one or more selected aggregation types on the plurality of rows of related attribute data corresponding to each root object of the plurality of root objects to produce a corresponding single aggregation row of consolidated data for each root object, the consolidated data comprising an average of the plurality of rows of related attribute data corresponding to each root object or a first attribute data from the plurality of rows of related attribute data appended next to a second attribute data from the plurality of rows of related attribute data; and
causing presentation of the user interface that presents each root object of the plurality of root objects with the corresponding single aggregation row of consolidated data resulting from the aggregation computation, the plurality of root objects being ordered on the user interface based on the join cardinality of each root object of the plurality of root objects,
wherein at least one of the one or more selected aggregation types comprise a concatenation operation, the concatenation operation comprising appending the first attribute data to the second attribute data, and the consolidated data comprising the first attribute data from the plurality of rows of related attribute data appended next to the second attribute data from the plurality of rows of related attribute data.

8. The system of claim 7, wherein the join cardinality for each root object of the plurality of roots objects corresponds to a number of rows of the plurality of rows of related attribute data linked to a respective root object of the plurality of root objects.

9. The system of claim 7, wherein a plurality of single aggregation rows with join cardinalities of one are grouped together, and wherein the causing presentation of the user interface comprises collapsing the plurality of single aggregation rows that are grouped together into a single collapsed row.

10. The system of claim 7, further comprising:
exporting of a dataset that comprises the plurality of root objects ordered based on the join cardinality of each root object, and the corresponding single aggregation row of consolidated data after the aggregation computation has been performed.

11. The system of claim 7, wherein the corresponding single aggregation row of consolidated data further comprises concatenation data generated by applying the concatenation operation to the plurality of rows of related attribute data corresponding to each root object.

12. The system of claim 7, wherein the one or more aggregation types comprise a maximum value operation, wherein the aggregation row comprises a maximum value generated by applying the maximum value operation to the plurality of rows of related attribute data corresponding to each root object, and wherein the maximum value is a single numeric value.

13. A non-transitory storage medium comprising executable instructions that when executed by a processor cause the processor to:
obtain a joined dataset based on a plurality of root objects, that comprises, for each of the plurality of root objects, a plurality of rows of related attribute data linked to each root object as a result of a join operation, each root object of the plurality of root objects comprising a join cardinality;
provide a user interface to present aggregation type selection data that allows a user to select one or more aggregation types from a plurality of different types of aggregation operations to apply to the plurality of rows of related attribute data;
perform an aggregation computation of the one or more selected aggregation types on the plurality of rows of related attribute data corresponding to each root object of the plurality of root objects to produce a corresponding single aggregation row of consolidated data for each root object, the consolidated data comprising an average of the plurality of rows of related attribute data corresponding to each root object or a first attribute data from the plurality of rows of related attribute data appended next to a second attribute data from the plurality of rows of related attribute data; and
cause presentation of the user interface that presents each root object of the plurality of root objects with the corresponding single aggregation row of consolidated data resulting from the aggregation computation, the plurality of root objects being ordered on the user interface based on the join cardinality of each root object of the plurality of root objects, wherein at least one of the one or more selected aggregation types comprise a concatenation operation, the concatenation operation comprising appending the first attribute data to the second attribute data, and the consolidated data comprising the first attribute data from the plurality of rows of related attribute data appended next to the second attribute data from the plurality of rows of related attribute data.

14. The non-transitory storage medium of claim 13, wherein the join cardinality for each root object of the plurality of roots objects corresponds to a number of rows of the plurality of rows of related attribute data linked to a respective root object of the plurality of root objects.

15. The non-transitory storage medium of claim 13, wherein a plurality of single aggregation rows with join cardinalities of one are grouped together, and wherein the causing presentation of the user interface comprises collapsing the single aggregation rows that are grouped together into a single collapsed row.

16. The non-transitory storage medium of claim 13, further comprising:

exporting of a dataset that comprises the plurality of root objects, ordered based on the join cardinality of each root object, and the corresponding single aggregation row of consolidated data after the aggregation computation has been performed.

17. The non-transitory storage medium of claim 13, wherein the corresponding single aggregation row of consolidated data further comprises concatenation data generated by applying the concatenation operation to the plurality of rows of related attribute data corresponding to each root object.

18. The non-transitory storage medium of claim 13, wherein the one or more aggregation types comprise a maximum value operation, wherein the aggregation row comprise a maximum value generated by applying the maximum value operation to the plurality of rows of related attribute data corresponding to each root object, and wherein the maximum value is a single numeric value.

* * * * *